United States Patent [19]

Nemoto et al.

[11] Patent Number: 4,823,206

[45] Date of Patent: Apr. 18, 1989

[54] VIDEO SIGNAL RECORDING AND/OR REPRODUCING APPARATUS

[75] Inventors: Shoji Nemoto, Kanagawa; Yukihiko Machida, Tokyo, both of Japan

[73] Assignee: Sony Corporation, Tokyo, Japan

[21] Appl. No.: 86,789

[22] Filed: Aug. 19, 1987

[30] Foreign Application Priority Data

Aug. 21, 1986 [JP]  Japan ............................... 61-196735

[51] Int. Cl.$^4$ ..................... G11B 21/10; G11B 27/10; H04N 5/782

[52] U.S. Cl. .................................. 360/19.1; 358/320; 360/14.2; 360/27; 360/33.1

[58] Field of Search ................... 360/14.2, 14.3, 19.1, 360/33.1, 27, 64, 77; 358/335, 337–339, 342, 343, 320–323

[56] References Cited

U.S. PATENT DOCUMENTS

| | | | |
|---|---|---|---|
| 4,563,714 | 1/1986 | Takeuchi | 360/77 |
| 4,669,005 | 5/1987 | Takayama et al. | 360/77 |
| 4,680,648 | 7/1987 | Takayama | 360/64 |

Primary Examiner—Marvin L. Nussbaum
Attorney, Agent, or Firm—Alvin Sinderbrand

[57] ABSTRACT

In a video signal recording and/or reproducing apparatus including four magnetic heads mounted on a rotary drum for forming four parallel recording tracks in a repeating sequence on a recording medium with each track having an azimuth gap angle different from the azimuth gap angles of the next adjacent tracks; pilot signals having different frequencies are recorded in a superimposed manner upon the information signals recorded by the four magnetic heads, respectively, and, upon reproducing, tracking control is effected so as to ensure that the magnetic heads which recorded the pilot signals with different respective frequencies are used to reproduce the signals recorded in the respective recording tracks so that a period of a timing signal, for example, a horizontal synchronizing signal, contained in the reproduced signal will not be disturbed upon switching from one to another of the magnetic heads in the reproducing mode.

13 Claims, 7 Drawing Sheets

VIDEO SIGNAL RECORDING AND/OR REPRODUCING APPARATUS

BACKGROUND OF THE INVENTION

1. Field of the Invention

The present invention relates generally to video signal recording and/or reproducing apparatus and more particularly is directed to a video tape recorder (CTR) of the helical scan type in which a magnetic tape is scanned by rotary magnetic heads along successive slant tracks.

2. Description of the Prior Art

Figure 1:
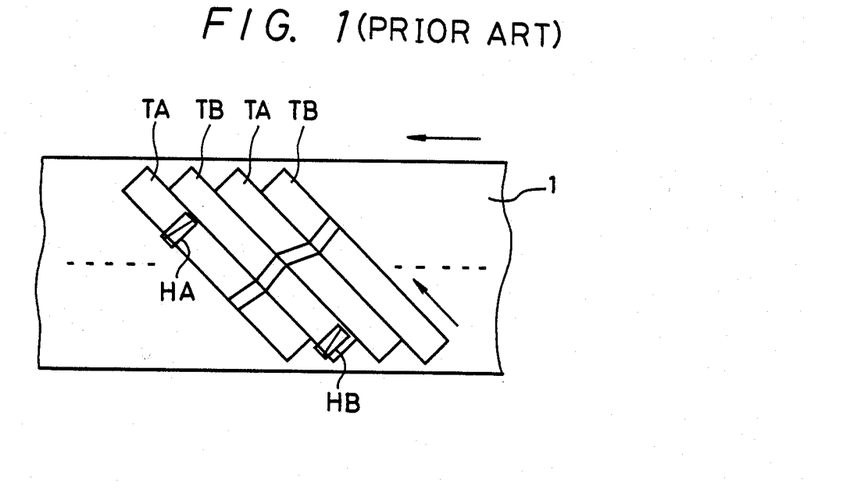
FIG. 1 is a diagrammatic representation of a known recording pattern on a magnetic tape.

In a standard video tape recorder (VTR), a pair of rotary magnetic heads having opposite azimuth gap angles are mounted on a rotary drum with an angular distance of 180° therebetween, and a magnetic tape is wrapped around the rotary drum over a tape wrapping angle of substantially 180°. In the recording made of such standard VTR, as shown in FIG. 1, recording tracks TA and TB are alternately formed in close side-by-side relation on a magnetic tape 1 by the pair of rotary magnetic heads HA and HB having different azimuth gap angles and such tracks extend obliquely or slant across the magnetic tape 1. A recording track conforming to the standard format can be formed by recording one field of a video signal in each recording track.

Figure 2:
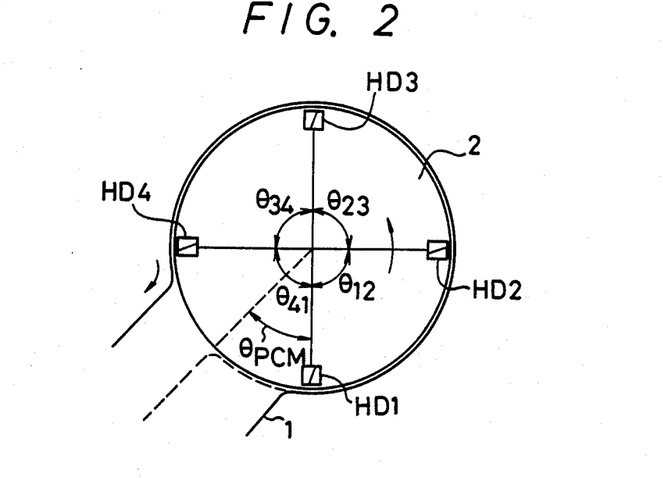
FIG. 2 is a schematic plan view of a rotary drum assembly in a video signal recording and/or reproducing apparatus of a type to which this invention may be advantageously applied.

In order to reduce the diameter of the rotary drum of the standard VTR for permitting miniaturizing of the overall arrangement of such VTR, it has been previously proposed, as shown in FIG. 2, to mount four rotary magnetic heads, HD1, HD2, HD3 and HD4 on a rotary drum 2 with an equal angular distance of 90° between the heads, and with the diameter of the rotary drum 2 being reduced to ⅔ the diameter of the rotary drum of the standard VTR. In such case, the magnetic tape 1 is wrapped around the rotary drum 2 with a tape wrapping angle of substantially 270°, as shown in full lines, and the rotational speed of the rotary drum 2 is increased to 1½ times the speed used in the case of the two-head VTR.

If the azimuth gap angles of the first and third rotary magnetic heads HD1 and HD3 are selected to be a positive angle (for example, +7°) and the azimuth gap angles of the second and fourth rotary magnetic heads HD2 and HD4, which are located at angular distances of 90° from the first and third rotary magnetic heads HD1 and HD3, are selected to be a negative angle (for example, −7°), each time the rotary drum 2 rotates three times, the rotary magnetic heads HD1, HD2, HD3 and HD4 sequentially scan four recording tracks TA, TB, TA and TB to thereby form a track pattern having the same format as is shown on FIG. 1.

This will be described more fully with reference to FIG. 3 in which a recording track TA1 is formed by the first rotary magnetic head HD1 having the azimuth gap angle of the HA head; a recording track TB2 is formed by the second rotary magnetic head HD2 having the azimuth gap angle of the HB head; a recording track TA3 is formed by the third rotary magnetic head HD3 having the azimuth gap angle of the HA head; and a recording track TB4 is formed by the fourth rotary magnetic head HD4 having the azimuth gap angle of the HB head. These four recording tracks TA1, TB2, TA3 and TB4, or four recording tracks corresponding thereto, are scanned by the magnetic heads HD1, HD2, HD3 and HD4 once each time the rotary drum 2 is rotated three times.

Figure 3:
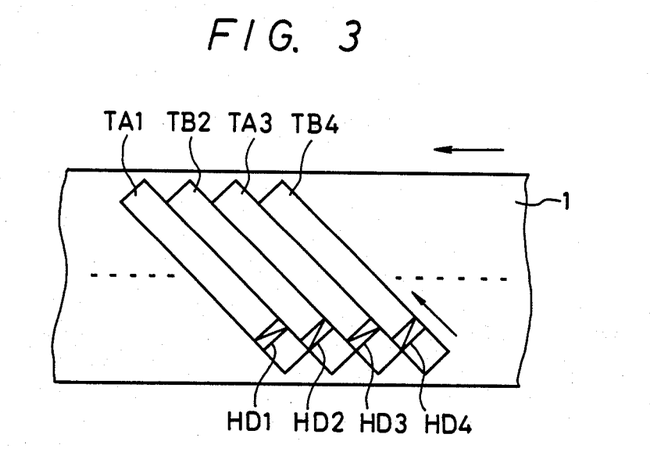
FIG. 3 is a diagrammatic representation of the recording pattern, and the relationship between the magnetic heads and recording tracks formed thereby with the rotary drum assembly of FIG. 2.

When the recording pattern of FIG. 3 with the same format as the standard recording pattern of FIG. 1 is formed on the tape 1 by the four rotary magnetic heads HD1, HD2, HD3 and HD4 mounted on the rotary drum 2 of reduced diameter, it will be apparent that the azimuth gap angles of the first and third rotary magnetic heads HD1 and HD3 are the same and the azimuth gap angles of the second and fourth rotary magnetic heads HD2 and HD4 are the same. For that reason, if the rotary magnetic heads HD1, HD2, HD3 and HD4 are made to track the recording tracks, in the reproducing mode, by the so-called control pulse (CTL) tracking servo system, there is no assurance that the recording tracks TA1, TB2, TA3 and TB4 recorded by the rotary magnetic heads HD1, HD2, HD3 and HD4 will be tracked by the same rotary magnetic heads HD1, HD2, HD3 and HD4 during reproducing. In other words, the tracking servo may lock onto a condition in which the rotary phase of the rotary drum 2 is displaced by an angular amount corresponding to two tracks, so that, for example, the recording tracks TA1, TB2, TA3 and TB4 are tracked by the magnetic heads HD3, HD4, HD1 and HD2, respectively, in that order.

In the above-mentioned CTL tracking servo system, a CTL signal (control signal) of logic level "1" or "0" is recorded in a track along a longitudinal edge of the magnetic tape and changes its logic level at each track in accordance with the recording azimuth gap angle of the respective one of the slant recording tracks TA1, TB2, TA3 and TB4. In the reproducing mode, such CTL signal is reproduced and used as the basis for tracking-control so that the recording tracks are reproduced by magnetic heads having the same azimuth gap angles.

Further, in a so-called 8 mm VTR now available on the market, the above mentioned control pulse (CTL pulse) is not recorded in a longitudinal track along an edge of the tape so that it becomes impossible to select the reproducing heads on the basis of a reproduced CTL pulse.

If a recording track is reproduced by a magnetic head different from the magnetic head used to record such track, variations in the angles between the rotary magnetic heads HD1, HD2, HD3 and HD4 mounted on the rotary drum 2 may cause so-called head mounting angle interference in the reproduced picture, that is, may cause reproduction of a skewed picture.

In this connection, if head mounting angles $\theta_{12}$, $\theta_{23}$, $\theta_{34}$, and $\theta_{41}$ (FIG. 2) between the rotary magnetic heads HD1, HD2; HD2, HD3; HD3, HD4; and HD4, HD1, respectively, contain head mounting angular errors $\alpha 1$, $\alpha 2$, $\alpha 3$ and $\alpha 4$, the head mounting angles $\theta_{12}$, $\theta_{23}$, $\theta_{34}$ and $\theta_{41}$ may be respectively expressed by the following Eqs. (1) to (4).

$$\theta_{12} = 90° + \alpha 1 \ldots \quad (1)$$

$$\theta_{23} = 90° + \alpha 2 \ldots \quad (2)$$

$$\theta_{34} = 90° + \alpha 3 \ldots \quad (3)$$

$$\theta_{41} = 90° + \alpha 4 \ldots \quad (4)$$

When the recording tracks TA1, TB2, TA3 and TB4 recorded by the rotary magnetic heads HD1, HD2, HD3 and HD4 mounted on the rotary drum 2 with such mounting angle errors α1 to α4 are respectively reproduced by the same rotary magnetic heads, the periods of the horizontal synchronizing signals contained in the reproduced signals obtained by switching from one to another of the heads HD1, HD2, HD3 and HD4, in turn, are coincident with those of the horizontal synchronizing signals inserted during recording. When each recording track is reproduced by the same recording head as was used to form that recording track, the apparatus is said to be operating in a head self-recording and/or reproducing mode, and the so-called head mounting angle interference or skewing will not appear in the reproduced picture.

Figure 4:
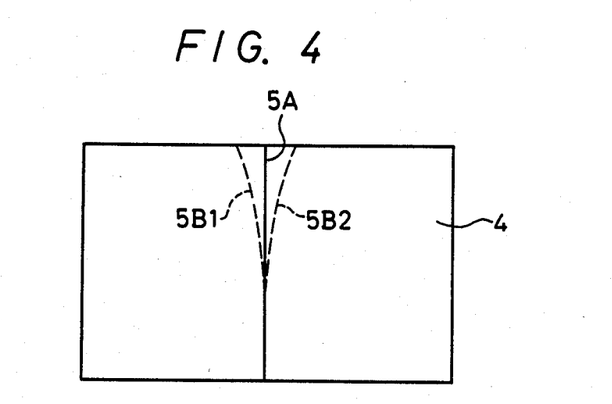
FIG. 4 is a diagrammatic illustration of a video display or picture to which reference will be made in explaining so-called head mounting angle interference.

However, if the recording tracks are reproduced by rotary magnetic heads different from the recording heads used to form the respective recording tracks, when the magnetic reproducing heads are switched, the periods of the horizontal synchronizing signals contained in the reproduced signals are displaced by amounts corresponding to the respective ones of the head mounting angle errors α1 to α4. As a result, as shown in FIG. 4, when the reproduced picture or image includes a straight line 5A to be displayed, for example, extending in the vertical direction of a picture screen 4, the occurrence of so-called head mounting angle interference causes a skewed picture in which the portions of the reproduced picture at opposite sides of the straight line 5A are expanded laterally, as shown by a dashed line 5B1 or 5B2.

In the reproducing circuit of the known VTR, the horizontal synchronizing signal contained in the reproduced signal is AFC (automatic frequency control)-controlled to thereby attempt to match its period with that of a predetermined reference synchronizing signal. However, in the reproducing mode, each time the rotary magnetic heads are switched, the period of the reproduced horizontal synchronizing signal may be never-the-less displaced for the lock-in time of the AFC loop. In other words, as shown on FIG. 4, the AFC control operation is not so effective at the upper portion of the picture screen 4, so that the skewing of the picture remains at such upper portion.

Further, when the recording track formed by a rotary head is not reproduced by the same rotary magnetic head, in addition to the above-described skewing of the picture, a so-called flicker may appear on the reproduced picture, for example, due to uneven rotation in each revolution of a motor, uneven amplitude of head output and scattering or variations of the frequency characteristics of the several heads.

OBJECTS AND SUMMARY OF THE INVENTION

Accordingly, it is an object of this invention to provide an improved video signal recording and/or reproducing apparatus which avoids the above-described problems.

More particularly, it is an object of this invention to provide a video signal recording and/or reproducing apparatus which can prevent disturbance of the period of the horizontal synchronizing or other timing signal contained in a reproduced signal when magnetic heads are switched.

It is another object of this invention to provide a video signal recording and/or reproducing apparatus which can reproduce a recorded information signal with excellent picture quality.

According to one aspect of the present invention, there is provided a video signal recording and/or reproducing apparatus comprising: four magnetic heads of which the first and third heads each have a first azimuth gap angle and the second and fourth heads each have a second azimuth gap angle; a rotary drum on which the first, second, third and fourth heads are mounted in the order stated with substantially equal angular distances therebetween, said first, second, third and fourth heads being operative for recording information on a recording medium in first, second, third and fourth recording tracks, respectively, so as to change azimuth gap angles from track to track, and for reproducing recorded information from said first, second, third and fourth recording tracks, respectively; means for superimposing first, second, third and fourth pilot signals having respective different frequencies on said information recorded by said first, second, third and fourth heads, respectively; and means operative during reproducing for tracking said first, second, third and fourth heads in respect to said first, second, third and fourth recording tracks in such a fashion that said first, second, third and fourth pilot signals are picked up or reproduced from said corresponding first, second, third and fourth recording tracks by said first, second, third and fourth heads, respectively.

According to another aspect of the present invention, there is provided a video signal reproducing apparatus in which parallel slant tracks having first and second different recording azimuth gap angles are alternately formed on a magnetic recording tape with an equal track pitch, and four kinds of tracking pilot signals having respective different frequencies are cyclically recorded in said slant tracks together with an information signal, comprising: four reproducing magnetic heads of which first and third reproducing magnetic heads have a first azimuth gap angle and second and fourth reproducing magnetic heads have a second azimuth gap angle, said heads being mounted on a rotary drum with equal angular distances therebetween in the order of said first, second, third and fourth reproducing magnetic heads; first switching means for switching between outputs of said first and third reproducing magnetic heads and second switching means for switching between outputs of said second and fourth reproducing magnetic heads; third switching means for switching outputs from said first and second switching means in synchronism with rotation of said rotary drum; means for extracting said tracking pilot signals from reproduced signals obtained from said reproducing magnetic heads through said third switching means; selector means for selecting a reference pilot signal from among four reference pilot signals generated sequentially with frequencies the same as those of said four kinds of tracking pilot signals, respectively; tracking error detecting means for producing a tracking error signal by comparing a pilot signal extracted from the reproduced signal obtained through said third switching means with the selected reference pilot signal; and switching control means for generating control signals for said first, second and third switching means and said selector means on the basis of a rotary phase of said rotary drum.

The above, and other objects, features and advantages of the present invention, will become apparent from the following detailed description of a preferred embodiment which is to be read in conjunction with the accompanying drawings, throughout which like reference numerals identify like elements and parts.

DESCRIPTION OF A PREFERRED EMBODIMENT

An embodiment of a video signal recording and/or reproducing apparatus 11 according to the present invention will now be described in detail with reference to FIG. 5 of the drawings.

Such video signal recording and/or reproducing apparatus 11 is shown to mainly comprise a recording and/or reproducing circuit 12 which is connected through rotary transformers RT1, RT2, RT3 and RT4 to the rotary magnetic heads HD1, HD2, HD3 and HD4, respectively.

In the recording mode of apparatus 11, the recording and/or reproducing circuit 12 is adapted to superimpose pilot signals PL1, PL2, PL3 and PL4 having frequencies f1, f2, f3 and f4, respectively, upon video signals recorded in the recording tracks TA1, TB2, TA3 and TB4 (FIG. 6) by the rotary magnetic heads HD1, HD2, HD3 and HD4, respectively, with each track having one field of the video signal recorded therein. In the reproducing mode, the magnetic heads HD1, HD2, HD3 and HD4 are controlled to properly trace the corresponding recording tracks TA1, TB2, TA3 and TB4 by an ATF (automatic tracking follow) processing circuit 13 employing the 4-frequency ATF system. More particularly, such ATF processing circuit 13 may employ a 4-frequency ATF system as disclosed in detail in EP publication No. 0089816, published Sept. 28, 1983, and which corresponds to U.S. Pat. No. 4,658,309 having a common assignee herewith.

In the present embodiment, the frequencies f1, f2, f3 and f4 of the pilot signals PL1, PL2, PL3 and PL4 are selected such that the pilot signals recorded in adjacent tracks will have frequency differences $\Delta fA$ and $\Delta fB$ expressed by the following Eqs. (5) and (6).

$$\Delta fA = |f1-f2| = |f3-f4| = 16 \text{ kHz} \qquad \ldots (5)$$

$$\Delta fB = |f2-f3| = |f4-f1| = 46 \text{ kHz} \qquad \ldots (6)$$

Accordingly, upon reproducing, it is possible to detect, by the appearance of the frequency difference $\Delta fA$ or $\Delta fB$ in the reproduced signal, whether the operative one of the rotary magnetic heads HD1 to HD4 is displaced in the rightward or leftward direction (FIG. 6) from the desired tracking position.

Figure 7A:
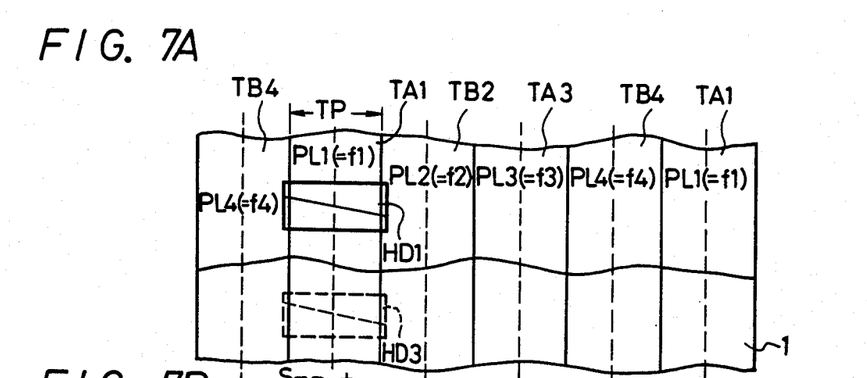
FIG. 7A is an enlarged diagrammatic view showing in greater detail the track pattern of FIG. 6 and the pilot signals recorded therein.
Figure 7B:
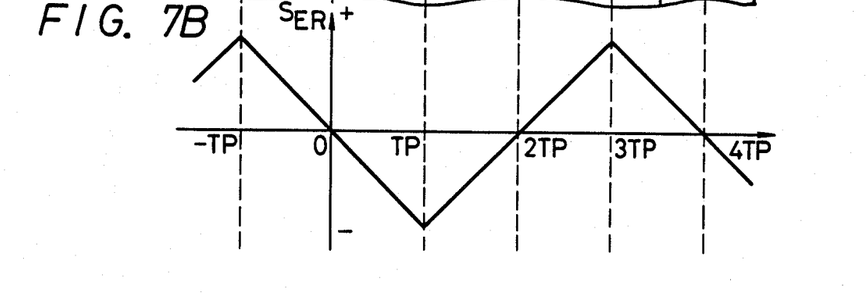
FIG. 7B is a corresponding graphic representation of changes in a tracking error signal in an automatic track following system and to which reference will be made in explaining a problem to be overcome by the present invention.

Referring now to FIGS. 7A and 7B, in which variations of a tracking error signal $S_{ER}$ are shown for various displacements of a rotary magnetic head, for example, the rotary magnetic head HD1, from the recording track TA1 which was recorded by that same rotary magnetic head HD1, it will be seen that, if the magnetic head HD1 is properly tracking the recording track TA1, the crosstalk amounts of the pilot signals PL2 and PL4 from the tracks TB2 and TB4 at the left-hand side and the right-hand side of the track TA1 are balanced so that the tracking error signal $S_{ER}$ becomes zero. On the other hand, if the magnetic head HD1 is displaced rightwardly from the center of track TA1 toward the adjacent recording track TB2 at the right-hand side of track TA1, the crosstalk amount of the pilot signal PL2 from the recording track TB2 is increased so that the magnitude of the component having the frequency difference $\Delta fA$ is increased on the basis of Eq.(5). Thus, the magnitude of the tracking error signal $S_{ER}$ is increased in the negative direction as head HD1 moves toward a position centered on track TB2.

If the rotary magnetic head HD1 is further displaced toward the right on FIG. 7A from the position at which the rotary magnetic head HD1 is centered in respect to recording track TB2, the component of the pilot signal PL2 from the track TB2 is decreased relative to the crosstalk component of the pilot signal PL3 from the track TA3 so that the magnitude of the tracking error signal $S_{ER}$ is gradually decreased to zero.

If the magnetic head HD1 is further displaced rightwardly to a position at which the rotary magnetic head HD1 is centered in respect to the track TA3 adjoining the track TB2, no signal component of the frequency differences $\Delta fA$ and $\Delta fB$ is produced. If the rotary magnetic head HD1 is further displaced rightwardly, the crosstalk signal component of the pilot signal PL4 from the adjacent track TB4 at the right-hand side of the track TA3 is produced so that the tracking error signal $S_{ER}$ is increased in the positive direction. If the rotary magnetic head HD1 is still further rightwardly displaced from the position at which the rotary magnetic head HD1 is centered in respect to the track TB4, the crosstalk signal component of the pilot signal PL4 from the recording track TB4 is decreased so that the tracking error signal $S_{ER}$ is gradually decreased to zero.

When the magnetic head HD1 is properly tracking the next track TA1 adjacent to track TB4, no tracking error signal $S_{ER}$ is produced.

As described hereinabove, if the magnetic heads HD1, HD2, HD3 and HD4 are properly tracking the corresponding recording tracks TA1, TB2, TA3 and TB4, respectively, or the track-displaced amount is 0, 4TP, 8TP, . . . , (where TP is the width of each track), . . . , a stable tracking condition can be maintained. If, on the other hand, the track-displaced amount is 2TP, 6TP, . . . , for example, the head HD1 is centered in respect to the track TA3, the tracking servo system is in an unstable oscillation condition. In the apparatus 11, this unstable oscillation condition is avoided, that is, the rotary magnetic heads are controlled by using a pilot detecting circuit to just track the corresponding recording tracks at stable positions corresponding to track-displaced amounts 0, 4TP, 8TP, . . . .

Consequently, the rotary magnetic head HD1 is made to properly track only the corresponding recording track TA1 in accordance with the ATF servo operation of the ATF processing circuit 13. The other magnetic heads HD2, HD3 and HD4 are similarly made to properly track only the corresponding recording tracks TB2, TA3 and TB4, respectively. As a result, when the magnetic heads HD1, HD2, HD3 and HD4 scan the magnetic tape 1 in the reproducing mode, the rotary magnetic heads HD1, HD2, HD3 and HD4 are servo-controlled so as to properly track the corresponding recording tracks TA1, TB2, TA3 and TB4, respectively.

The recording and/or reproducing circuit 12 is arranged so as to perform the 4-frequency tracking control on the basis of the above mentioned operating principle. The arrangement and operation of the recording and/or reproducing circuit 12 will now be described with reference to FIG. 5, in which a switching control circuit 21 is shown to receive a switching pulse SWP (FIG. 8A) which changes its logic level between "L" (low level) and "H" (high level" each time the rotary drum 2 is rotated to a position at which one of the rotary magnetic heads HD1, HD2, HD3 and HD4 starts scanning the magnetic tape 1. Switching control circuit 21 further receives a rotation detecting pulse PG (FIG. 8B) which rises once during each revolution of the rotary drum 2 and a rotation frequency signal pulse FG which corresponds to the rotational speed of the rotary drum 2.

Figure 8A:
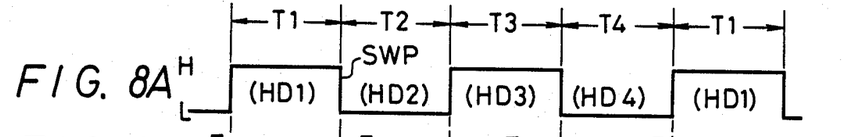
FIGS. 8A to 8F are respective signal waveforms showing signals appearing at respective portions of the video signal recording and/or reproducing apparatus shown in FIG. 5.
Figure 8B:
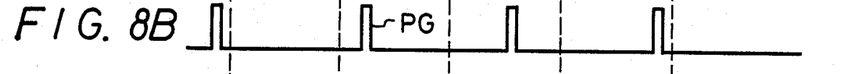
Figure 8C:
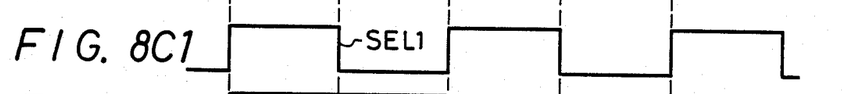

The switching pulse SWP and the rotation detecting pulse PG indicate timings at which the rotary magnetic heads HD1, HD2, HD3 and HD4 are switched in synchronism with the rotation of the rotary drum 2. As illustrated in FIGS. 8A and 8B, the period T1 of the switching pulse SWP which rises immediately after the occurrence of a rotation detecting pulse PG represents the scanning period of the first rotary magnetic head HD1. Likewise, the subsequent periods T2, T3 and T4, in which the switching pulse SWP changes its logic level alternately, correspond to the periods in which the second, third and fourth rotary magnetic heads HD2, HD3 and HD4, respectively, are scanning the magnetic tape 1.

The switching control circuit 21 produces, in response to the switching pulse SWP, a first selecting signal SEL1 which changes its level in time with the switching pulse SWP, as shown in FIG. 8C1. The switching control circuit 21 also produces a second selecting signal SEL2 shown in FIG. 8C2, and which results from frequency-dividing the first selecting signal SEL1 by 2. The first and second selecting signals SEL1 and SEL2 are both supplied to a pilot signal selecting circuit 22.

Figures 8C, 8D:
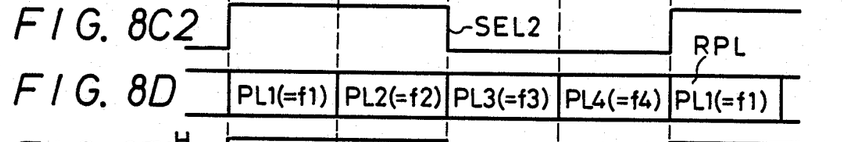
Figures 8E, 8E, 8F, 8F:
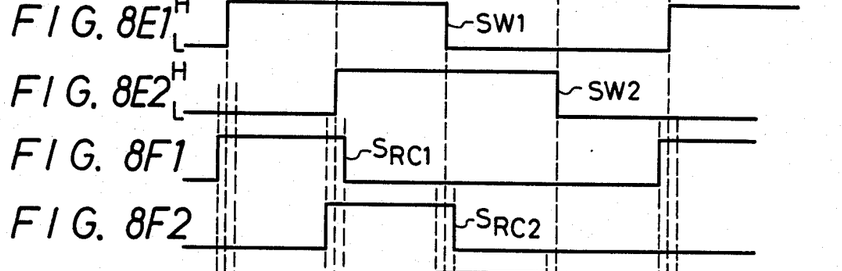
Figures 8F, 8F:
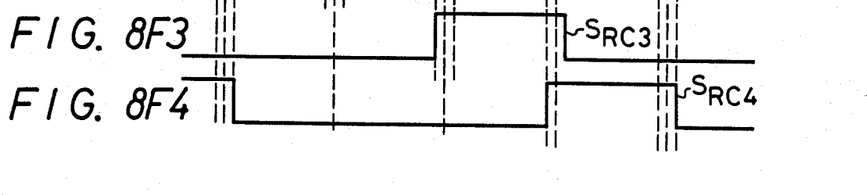

The pilot signal selecting circuit 22 is adapted to select, during each of the periods T1, T2, T3 and T4, a respective one of the pilot signals PL1, PL2, PL3 and PL4 of frequencies f1, f2, f3 and f4 derived from a pilot signal generating circuit 23 on the basis of the first and second selecting signals SEL1 and SEL2, and to deliver the selected pilot signal as a reference pilot signal RPL (FIG. 8D).

In the recording mode, the switching control circuit 21 of the recording and/or reproducing circuit 12 is adapted to supply recording control or gating signals $S_{RC1}$, $S_{RC2}$, $S_{RC3}$ and $S_{RC4}$ (FIGS. 8F1, 8F2, 8F3 and 8F4) to gated recording amplifying circuits REC1, REC2, REC3 and REC4, respectively. As shown in FIGS. 8F1, 8F2, 8F3 and 8F4, the recording control or gating signals SRC1, SRC2, SRC3 and SRC4 are concurrent with, and have pulse widths which are slightly wider than the head scanning periods T1, T2, T3 and T4, respectively.

The gated recording amplifying circuits REC1, REC2, REC3 and REC4 are adapted to supply recording signals VD1, VD2, VD3 and VD4 through rotary transformers RT1, RT2, RT3 and RT4 to the recording heads HD1, HD2, HD3 and HD4, respectively, during the intervals when the respective heads are scanning tracks on the magnetic tape. The recording signals VD1, VD2, VD3 and VD4 include the corresponding pilot signals PL1, PL2, PL3 and PL4 superimposed upon information signals, such as, composite video signals VD, each of which is formed of a luminance signal, a chroma signal and an audio FM (frequency modulated) signal.

Figure 6:
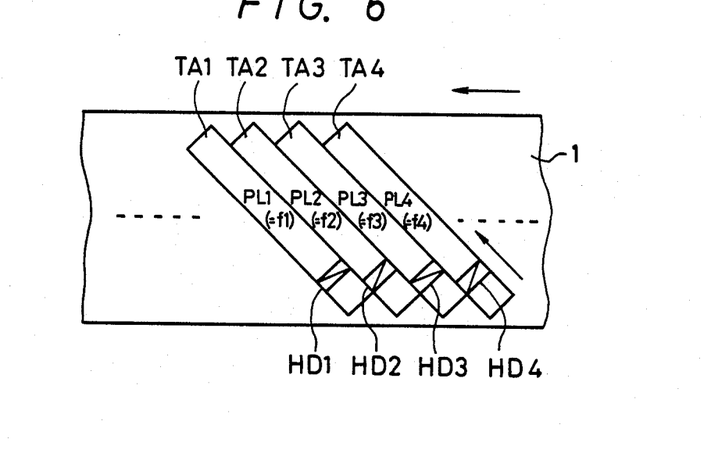
FIG. 6 is a diagrammatic view showing the pattern of recording tracks recorded on a magnetic tape by the apparatus of FIG. 5.

Accordingly, the rotary magnetic heads HD1, HD2, HD3 and HD4 record, in the recording tracks TA1, TB2, TA3 and TB4, respectively, the video signals and the pilot signals PL1, PL2, PL3 and PL4, respectively, as earlier noted in connection with FIG. 6.

In the reproducing mode, the switching circuit 21 generates first and second switching signals SW1 and SW2 and supplies them to switching circuits W1 and W2. The first switching signal SW1 (FIG. 8E1) is formed by frequency-dividing the switching pulse SWP by 2, and the second switching signal SW2 is formed by delaying the phase of the first switching signal SW1 by a delay corresponding to the scanning period T1, as shown in FIG. 8E2.

The switching circuit W1 receives reproduced signals $S_{PB1}$ and $S_{PB3}$ from the first and third rotary magnetic heads HD1 and HD3 having the positive azimuth gap angles through playback amplifying circuits PB1 and PB3, respectively. The switching circuit W1 supplies the reproduced signal $S_{PB1}$ to a switching circuit W3 when the first switching signal SW1 is high in level (at logic level "H"). Conversely, switching circuit W1 supplies the reproduced signal $S_{PB3}$ to the switching circuit W3 when signal SW1 is low in level (at logic level "L").

In like manner, the switching circuit W2 receives reproduced signals $S_{PB2}$ and $S_{PB4}$ from the second and fourth magnetic heads HD2 and HD4 having the negative azimuth gap angles through playback amplifying circuits PB2 and PB4, respectively. The switching circuit W2 supplies the reproduced signal $S_{PB2}$ to the switching circuit W3 when the second switching signal SW2 (FIG. 8E2) is high in level (at logic level "H"), while the reproduced signal $S_{PB4Y}$ is supplied to the switching circuit W3 when signal SW2 is low in level (at logic level "L").

The switching pulse SWP (FIG. 8A) is supplied to the switching circuit W3 as a switching signal, whereby the first and third reproduced signals $S_{PB1}$ and $S_{PB3}$ supplied from the first switching circuit W1 to the switching circuit W3 during the head scanning periods T1 and T3, respectively, in each of the switching pulse SWP is at logic level "H", are delivered through the switching circuit W3 as portions of a reproduced video signal VIDEO.

On the other hand, the switching circuit W3 passes, as other portions of the reproduced video signal VIDEO, the reproduced video signals $S_{PB2Y}$ and $S_{PB4Y}$ from the second switching circuit W2 during the head scanning periods T2 and T4 in which the switching pulse SWP is at logic level "L".

As a result, the reproduced signals $S_{PB1}$, $S_{PB2}$, $S_{PB3}$ and $S_{PB4}$ obtained from the first, second, third and fourth magnetic heads HD1, HD2, HD3 and HD4, respectively, during the scanning periods T1, T2, T3 and T4 are sequentially delivered through the switching circuit W3 as the reproduced video signal VIDEO. Such reproduced video signal VIDEO is supplied to a video processor circuit (not shown) and also to a low pass filter 24.

The reproduced video signal VIDEO contains the signal components of the pilot signals PL1, PL2, PL3 and PL4 recorded on the recording tracks TA1, TB2, TA3 and TB4, respectively, as already described in connection with Figs. 7A and 7B. The frequencies f1, f2, f3 and f4 of the pilot signals PL1, PL2, PL3 and PL4 are selected to be sufficiently low so that these pilot signals PL1, PL2, PL3 and PL4 are extracted or passed by the low pass filter 24 as a reproduced pilot signal PPL and supplied to a multiplying circuit MUL.

The reference pilot signal RPL from the pilot signal selecting circuit 22 is also supplied to the multiplying circuit MUL which produces a multiplied output signal $S_{MUL}$, converts the same to DC level signals and compares such DC level signals to thereby generate the tracking error signal $S_{ER}$ (FIG. 7B) indicating the rightwardly or leftwardly displaced amount of the rotary magnetic head. This tracking error signal $S_{ER}$ is supplied to a capstan servo circuit 25. The capstan servo circuit 25 is adapted to control the rotational speed of a capstan motor 26 in such a fashion that the tracking error signal $S_{ER}$ becomes zero. Thus, a rotary magnetic head is made to properly track the corresponding recording track.

With the arrangement described above, in the recording mode of the recording and/or reproducing circuit 12, the recording amplifying circuits REC1, REC2, REC3 and REC4 are sequentially operated by the recording control signals $S_{RC1}$ (FIG. 8F1), $S_{RC2}$ (FIG. 8F2), $S_{RC3}$ (FIG. 8F3) and $S_{RC4}$ (FIG. 8F4) during the scanning periods T1, T2, T3 and T4, respectively, in response to the switching pulse SWP (FIG. 8A) indicative of the rotary phase of the rotary drum 2 and the rotation detecting pulse PG (FIG. 8B). In consequence, of the foregoing, the recording signals VD1, VD2, VD3 and VD4, with the pilot signals PL1, PL2, PL3 and PL4 (FIG. 8D) respectively superimposed thereon, are sequentially recorded in the tracks TA1, TA2, TA3 and TA4 on the magnetic tape 1 by the rotary magnetic heads HD1, HD2, HD3 and HD4, respectively, with each such track having a different azimuth gap angle from the adjacent tracks.

Thus, as described before and shown in FIG. 6, the recording tracks TAl, TA2, TA3 and TA4 are sequentially recorded in the form of a recording pattern with no guardbands by the rotary magnetic heads HD1, HD2, HD3 and HD4, which recording pattern satisfies the standard tape format.

When the thus recorded magnetic tape 1 is reproduced, the switching circuits W1, W2 and W3 in the recording and/or reproducing circuit 12 are respectively switched by the switching signals SW1 (FIG. 8E1), SW2 (FIG. 8E2) and SWP (FIG. 8A) so that the switching circuit W3 permits the reproduced signals $S_{PB1}$, $S_{PB2}$, $S_{PB3}$ and $S_{PB4}$ reproduced by the magnetic heads HD1, HD2, HD3 and HD4 during the scanning periods T1, T2, T3 and T4, respectively to be delivered therethrough in sequences the reproduced video signal VIDEO.

If the rotary magnetic heads HD1, HD2, HD3 and HD4 are displaced from the positions at which they properly track the corresponding recording tracks TA1, TB2, TA3 and TB4 because the rotary phase of the rotary drum 2 is displaced relative to the magnetic tape 1, the ATF processing circuit 13 generates the corresponding tracking error signal $S_{ER}$ which, in the capstan servo circuit 25, suitably controls the capstan motor 26 to cause the rotary magnetic heads HD1, HD2, HD3 and HD4 to properly track the corresponding recording tracks TA1, TB2, TA3 and TB4, respectively.

If the first magnetic head HD1 scans any one of the recording tracks TB2, TA3 and TB4, that is, any track except the recording track TA1 on which the pilot signal PL1 is recorded, the ATF processing circuit 13 generates the tracking error signal $S_{ER}$ which causes a change in the speed at which the tape is driven so that the rotary magnetic head HD1 again properly tracks the recording track TA1.

In like manner, tracking error signals $S_{ER}$ are sequentially delivered for the second, third and fourth rotary magnetic heads HD2, HD3 and HD4 which are thereby made to properly track the corresponding recording tracks TB2, TA3 and TB4 on which the corresponding pilot signals PL2, PL3 and PL4 are recorded.

By reason of the circuitry described above, even if errors occur in the angular distances between the magnetic heads HD1, HD2, HD3 and HD4 mounted on the rotary drum 2, the ATF tracking servo is effected so that, in the reproducing mode, the rotary magnetic heads HD1, HD2, HD3 and HD4 are always made to properly track the recording tracks TA1, TB2, TA3 and TB4, respectively, that were recorded by the corresponding rotary magnetic heads HD1, HD2, HD3 and HD4. Thus, it becomes possible to prevent a skewed picture from appearing on the picture screen 4 (FIG. 4) in response to the reproduced video signal VIDEO.

By the way, although the first and third rotary magnetic heads HD1 and HD3 record the video signals at the same positive azimuth gap angle, even if the third rotary magnetic head HD3 scans the recording track TA1, as shown in dash-lines on FIG. 7A, and thereby picks up the pilot signal PL1 recorded in the recording track TA1 by the first rotary magnetic head HD1, the tracking error signal $S_{ER}$ generated during the scanning period T3 of the third rotary magnetic head HD3 indicates the scanning of a track displaced by the width of two tracks from the desired scanning position with the result that it becomes possible to effectively avoid stable tracking of the recording track TA1 by head HD3.

Similarly, the first rotary magnetic head HD1 can be prevented from stably tracking the recorded track TA3, and the second rotary magnetic head HD2, or the fourth rotary magnetic head HD4, can be prevented from stably tracking the recording track TB4 (or the recording track TB2, respectively, having the same azimuth gap angle.

Figure 5:
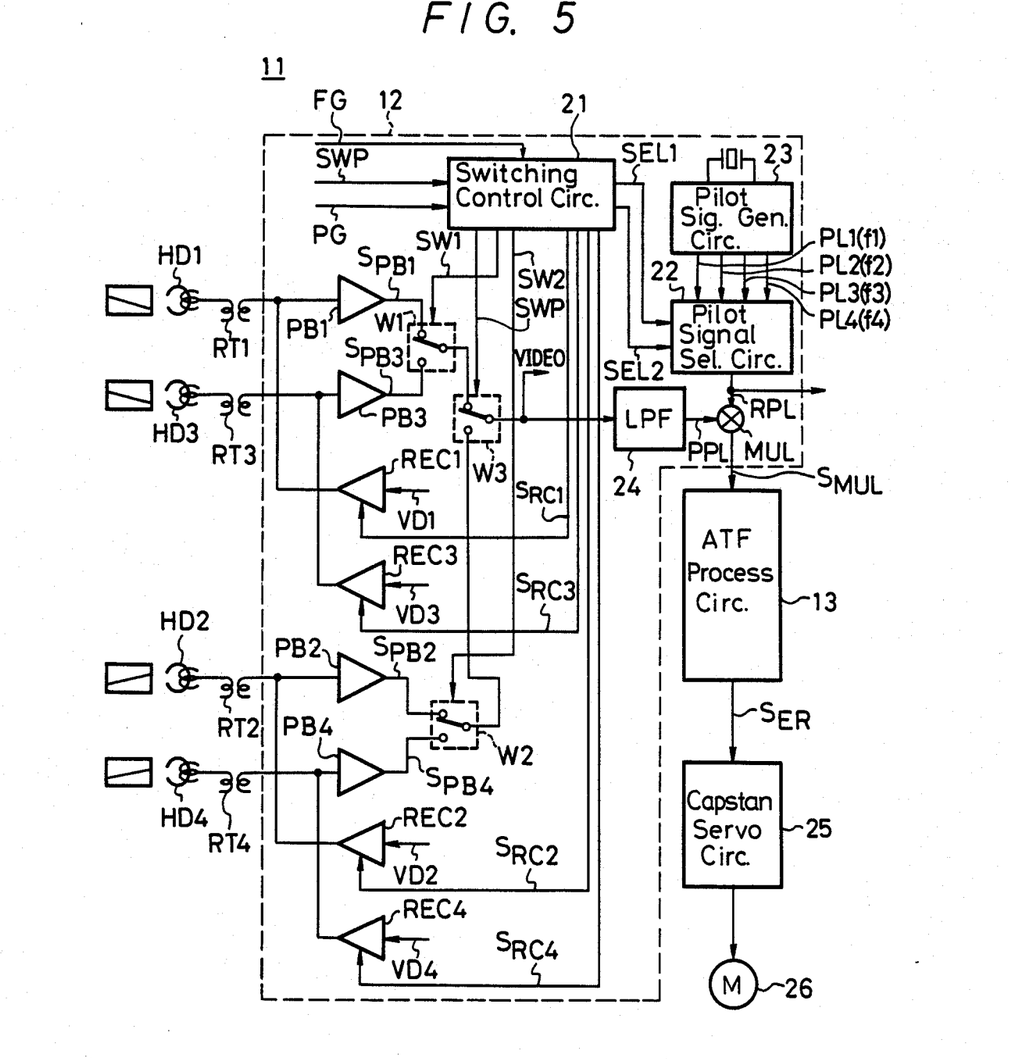
FIG. 5 is a block diagram of a video signal recording and/or reproducing apparatus according to an embodiment of the present invention.

An arrangement of the switching control circuit 21 that may be used in the recording and/or reproducing circuit 12 (FIG. 5) will be described more fully with reference to FIG. 9, in which parts corresponding to those described with reference to FIG. 5 are identified by the same references and therefore are not further described in detail.

Figure 9:
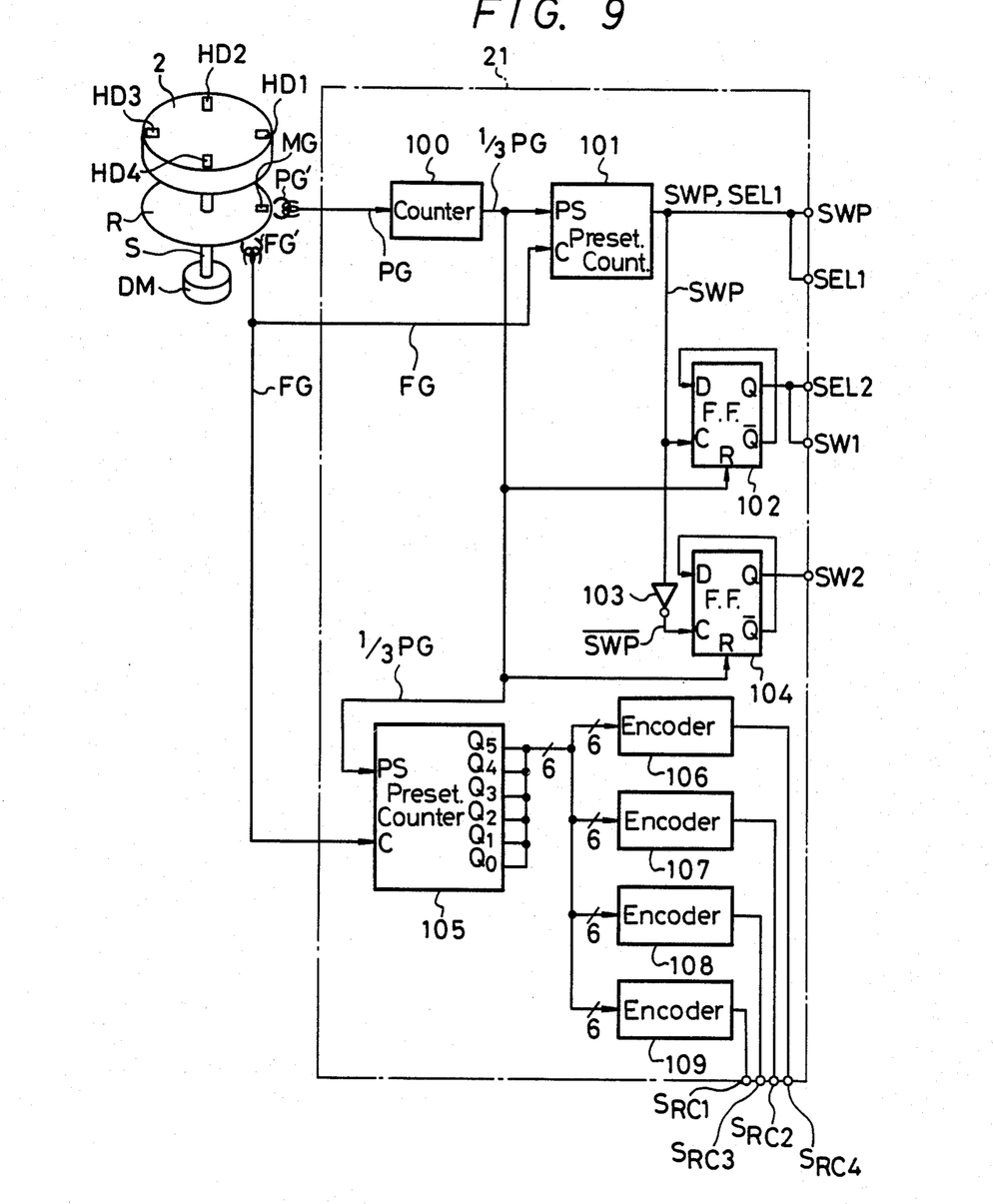
FIG. 9 is a block diagram showing details of a switching control circuit included in the video signal recording and/or reproducing apparatus of FIG. 5.
Figure 10A:
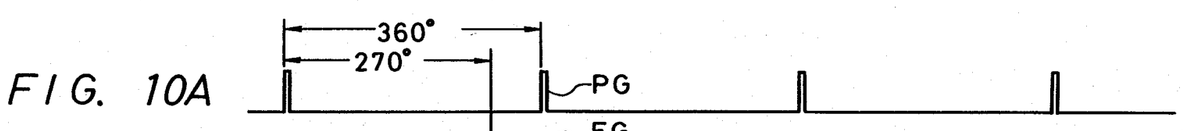
FIGS. 10A to 10I are respective signal waveforms to which reference will be made in explaining the operation of the circuit of FIG. 9.
Figure 10B:
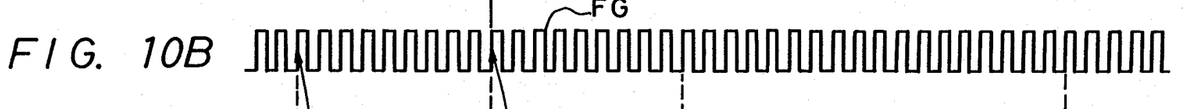

In FIG. 9, the rotary drum 2 on which the four magnetic heads HD1 to HD4 are mounted is shown to be rotated by shaft S of a motor DM, and a rotary disk R is attached to the motor shaft S. On the rotary disk R, there are provided a single magnet MG which generates one magnetic flux in the coil of a fixed head PG' each time the motor DM rotates drum 2 and disk R through a single revolution. A relatively large number, for example, 36, of magnets (not shown) are equally angularly spaced on the disk R so as to generate 36 magnetic fluxes in a fixed head FG' each time the motor DM rotates disk R through one revolution. In practice, a larger number of magnets may be provided on the disk R for cooperation with the head FG', thereby to increase the frequency of the resulting pulse signal. Head PG' and head FG' produce the pulse signals PG and FG (FIGS. 10A and 10B). The pulse PG is adapted to indicate the reference rotary phase of the rotary drum 2 whereas the pulse FG becomes a clock pulse corresponding in frequency to the rotational speed of motor DM and being used in the succeeding circuit.

Figure 10C:
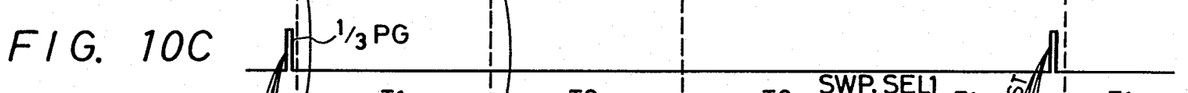
Figure 10D:
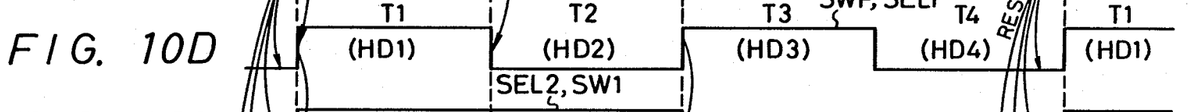
Figure 10E:
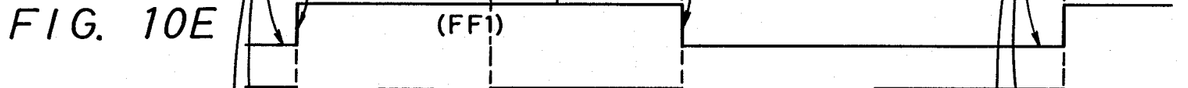
Figure 10F:
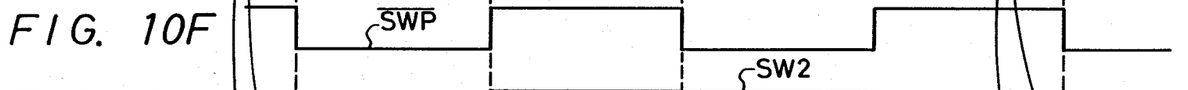
Figure 10G:
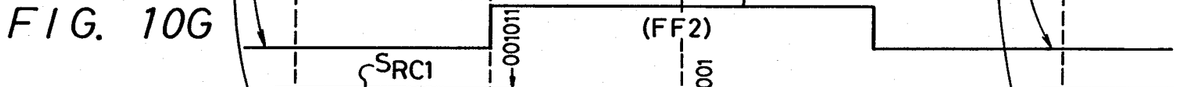

The pulse PG is supplied to a counter 100, in which it is counted down or divided by 3 to provide a pulse ⅓PG (FIG. 10C). The pulse ⅓PG is generated each time the rotary drum 2 turns through three revolutions. The pulse ⅓PG from the counter 100 is supplied to an input terminal PS of a presettable counter 101. The counter 101 is preset to zero each time it receives the pulse ⅓PG at the input terminal PS. The presettable counter 101 receives the pulse FG' at its clock terminal C and generates the pulses SWP and SEL1 (FIG. 10D). The pulses SWP and SEL1 rise up at the arrival of the first pulse FG just after the presettable counter 101 is reset to zero, fall down at the arrival of the 10th pulse FG, and then rise up again at the arrival of the 19th pulse FG from the first pulse FG to the counter 101. As shown in FIG. 10D, such configuration of pulses SWP and SEL1 is repeated. These pulses SWP and SEL1, which correspond to the similarly identified signals shown in FIG. 8A and FIG. 8C1, are adapted to indicate the times at which the rotary magnetic heads HD1 to HD4 are sequentially used or made operative in the recording and/or reproducing modes. The switching pulse SWP is supplied to a clock terminal C of a D-type flip-flip circuit 102 which thereby generates an output at the leading or trailing edge of the switching pulse SWP. Thus, D-type flip-flip circuit 102 generates, at its output terminal Q, pilot signal selecting and head selecting pulses or signals SEL2 and SW1 (FIG. 10E and FIGS. 8C2 and 8E1). Further, the pulse ⅓PG is supplied to a reset terminal R of the D-type flip-flop circuit 102, whereby the phases of the pulses SEL1 and SW1 are synchronized with that of the pulse ⅓PG. As set forth above, the pulse SEL2 together with the pulse SEL1 are employed for selecting one of the pilot signals PL1 to PL4. The switching pulse SWP is inverted by an inverter 103 into a pulse $\overline{SWP}$ (FIG. 10F). This inverted pulse $\overline{SWP}$ is supplied to a clock terminal C of a D-type flip-flop circuit 104. Since the pulse ⅓PG is supplied to a rest terminal R of the D-tpe flip-flop circuit 104, an output pulse SW2 (FIG. 10G) synchronized with the pulse ⅓PG can be produced at the output terminal Q of the D-type flip-flop circuit 104. This pulse SW2 and the above mentioned pulse SW1 serve as the head switching pulses of FIGS. 8E2 and 8E1 and of FIGS. 10G and 10E.

Figures 10H, 10I:
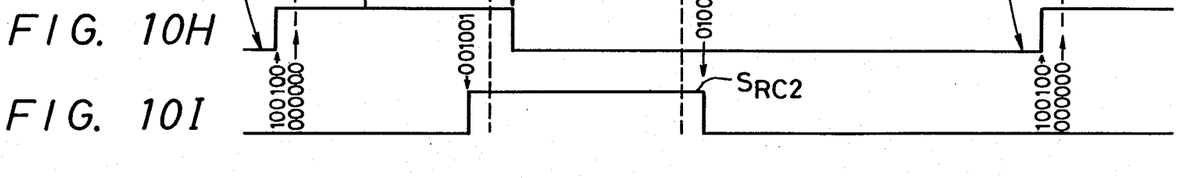

Further, the pulse ⅓PG is supplied to a preset input terminal PS of a presettable counter 105 and the pulse FG is supplied to a clock terminal C of counter 105. Accordingly, the presettable counter 105 is preset to "000000" by each pulse ⅓PG, and then counts the pulse FG sequentially until it generates a 6-bit parallel output. The output from the presettable counter 105 is supplied to encoders 106 to 109. The encoder 109 is adapted to generate the pulse $S_{RC1}$ (FIG. 10H) which rises up when the presettable counter 105 counts the 36th pulse FG, or is set to "100100" in the binary code notation, and which falls down when the presettable counter 105 counts the 11th pulse FG or is set to "001011".

The encoder 107 is adapted to generate the pulse $S_{RC2}$ (FIG. 10I) which rises up when the presettable counter 105 counts the 9th pulse FG, or the presettable counter 105 is set to "001001", and which falls down when the presettable counter 105 counts the 20th pulse FG, or the presettable counter 107 is set to "010001". Similarly, the encoders 108 and 106 are adapted to generate the pulses $S_{RC3}$ and $S_{RC4}$, respectively, which rise up, or attain logic level "H", when the presettable counter 105 counts the 18th pulse FG and 29th pulse FG, respectively, and which fall down when counter 105 counts the 27th pulse FG and 1st pulse FG, respectively. These pulses $S_{RC1}$ to $S_{RC4}$ are respectively supplied to the recording amplifiers REC1 to REC4 as the gating signals for controlling recording as described before.

The switching control circuit 21 is not limited to the circuit arrangement described above but may be modified or replaced by, for example, a microcomputer controlled in accordance with a program to produce input and output signals similar to those described above.

While the video signal has been described above as being recorded and/or reproduced by four rotary magnetic heads HD1 to HD4, it is to be appreciated that a tape recorded by a so-called 8 mm VTR, for example, of the two-head type now available on the market, can be reproduced by a four-head VTR utilizing the described reproducing circuit according to the present invention. The foregoing is made possible by the fact that the recording pattern of the signals recorded on the magnetic tape by the recording apparatus embodying the invention has sufficient compatibility with the recording pattern of the signals recorded by the conventional 8 mm VTR of the two-head type.

While the invention has been specifically described as applied to a VTR having the format in which the video signal is recorded in the recording tracks TA1 to TB4 formed by scanning the magnetic tape 1 wrapped around the rotary drum 2 with a wrap angle of substantially 270° by means of the rotary magnetic heads HD1 to HD4 extending over an angular range of 270° on the drum, the present invention is not limited to such VTR but may be applied to VTRs having various other formats.

For example, the present invention can be applied to a VTR (corresponding to what may be called an 8 mm VTR) having a format in which, as shown by a dashed line in FIG. 2, the wrapping angle of the magnetic tape 1 around the rotary drum 2 is extended to more than 270°, and in which a PCM (pulse code modulated) audio signal with its time base compressed is recorded in each slant track on the magnetic tape 1 over an angular range of $\theta_{pcm}$ (for example, about 45°) which is the angle by which the wrapping angle exceeds 270°.

While the invention has been described as applied to a VTR, the present invention is not limited to a VTR but can be applied to a wide variety of information recording and/or reproducing apparatus for recording and/or reproducing information containing a predetermined timing signal, such as, a horizontal synchronizing signal.

By way of summary, it will be seen that, in accordance with this invention, when the recording tracks are formed on the magnetic tape so as to have a recording pattern characteristic of the so-called double azimuth 4-head system in which four rotary magnetic heads are used and the azimuth gap angles of the rotary magnetic heads are changed alternately, the rotary magnetic heads are made to properly track the recording tracks in the reproducing mode by a 4-frequency ATF tracking system in such a fashion that the several recording tracks are reproduced by the same rotary magnetic heads as were used for recording in the respective tracks. For this reason, even when an error occurs in the angular distances between the four rotary magnetic heads mounted on the rotary drum, it is possible to prevent disturbance of the period of the timing signal or horizontal synchronizing signal upon switching from one to another of the reproducing rotary magnetic heads. Thus, it is possible to easily realize a video signal recording and/or reproducing apparatus which can reproduce the information recorded with high definition.

Although a single preferred embodiment of the invention has been described above with reference to the drawings, it will be apparent that the invention is not limited thereto, and that many modifications and variations could be effected therein by one skilled in the art without departing from the spirit or scope of the invention as defined by the appended claims.

What is claimed is:

1. A video recording and/or reproducing apparatus comprising:
    first, second, third and fourth magnetic heads of which said first and third heads each have a first azimuth gap angle and said second and fourth heads each have a second azimuth gap angle;
    a rotary drum on which said first, second, third and fourth heads are mounted successively in the order stated with substantially equal angular distances therebetween;
    means rendering all of said first, second, third and fourth heads operative, in a recording mode of the apparatus, for recording information on a recording medium in first, second, third and fourth recording tracks, respectively, so as to change azimuth gap angles from track to track and, in a reproducing mode of the apparatus, for reproducing recorded information from said first, second, third and fourth recording tracks, respectively;
    means operative in said recording mode for superimposing first, second, third and fourth pilot signals having respective different frequencies on said information recorded by said first, second, third and fourth heads, respectively; and
    means operative in said reproducing mode for tracking said first, second, third and fourth heads in respect to said first, second, third and fourth recording tracks, respectively, in such a fashion that said first, second, third and fourth pilot signals are reproduced from said corresponding first, second, third and fourth recording tracks by said first, second, third and fourth heads, respectively.

2. A video recording and/or reproducing apparatus comprising:
    first, second, third and fourth magnetic heads of which said first and third heads each have a first azimuth gap angle and said second and fourth heads each have a second azimuth gap angle:
    a rotary drum on which said first, second, third and fourth heads are mounted in the order stated with substantially equal angular distances therebetween, said first, second, third and fourth heads being operative, in a recording mode of the apparatus, for recording information on a recording medium in first, second, third and fourth recording tracks, respectively, so as to change azimuth gap angles from track to track and, in a reproducing mode of the apparatus, for reproducing recorded information from said first, second third and fourth recording tracks, respectively,
    said recording medium being in the form of a magnetic tape wrapped about said rotary drum with a wrapping angle of approximately 270°, and said first, second, third and fourth heads scanning said first, second, third and fourth recording tracks, respectively, during each three successive revolutions of said drum;
    means operative in said recording mode for superimposing first, second, third and fourth pilot signals having respective different frequencies on said information recording by said first, second, third and fourth heads, respectively; and
    means operative in said reproducing mode for tracking said first, second, third and fourth heads in respect to said first, second, third and fourth recording tracks in such a fashion that said first, second, third and fourth pilot signals are reproduced from said corresponding first, second, third and fourth recording tracks by said first, second, third and fourth heads, respectively.

3. A video recording and/or reproducing apparatus comprising:
    first, second, third and fourth magnetic heads of which said first, and third heads each have a first azimuth gap angle and said second and fourth heads each have a second azimuth gap angle;
    rotary drum on which said first, second, third and fourth heads are mounted in the order state with substantially equal angular distances therebetween, said first, second, third and fourth heads being operative, in a recording mode of the apparatus, for recording information on a recording medium in first, second, third and fourth recording tracks, respectively, so as to change azimuth gap angles from track to track and, in a reproducing mode of the apparatus, for reproducing recording information from said first, second, third and fourth recording tracks, respectively, said recording medium being in the form of a magnetic tape wrapped about said rotary drum with a wrapping angle substantially exceeding 270°, and said information recorded by each of said first, second, third and fourth heads, respectively, including video information which is supplied to the respective head during the scanning of a portion of the respective one of said recording tracks corresponding to a wrapping angle of 270° so that an overscan portion remains in each of said recording tracks for receiving recording audio information;

means operative in said recording mode for superimposing first, second, third and fourth pilot signals having respective different frequencies on said information recorded by said first, second, third and fourth heads, respectively; and means operative in said reproducing mode for tracking said first, second, third and fourth heads in respective to said first, second, third and fourth recording tracks in such a fashion that said first, second, third and fourth pilot signals are reproduced from said corresponding first, second, third and fourth recording tracks by said first, second, third and fourth heads, respectively.

4. A video recording and/or reproducing apparatus comprising:

first, second, third and fourth magnetic heads of which said first and third heads each have a first azimuth gap angle and said second and fourth heads each have a second azimuth gap angle;

a rotary drum on which said first, second, third and fourth heads are mounted in the order stated with substantially equal angular distances therebetween, said first, second, third and fourth heads being operative, in a recording mode of the apparatus, for recording information on a recording medium in first, second, third and fourth recording tracks, respectively, so as to change azimuth gap angles from track to track;

means operative in said recording mode for superimposing first, second, third and fourth pilot signals having respective different frequencies on said information recorded by said first, second, third and fourth heads, respectively;

said magnetic heads being operative, in a reproducing mode of the apparatus, for reproducing said information and superimposed pilot signals from said recording tracks;

first switching means operative in said reproducing mode for switching between outputs of said first and third magnetic heads;

second switching means operative in said reproducing mode for switching between outputs of said second and fourth magnetic heads;

third switching means for switching outputs from said first and second switching means in synchronism with rotation of said rotary drum;

means for extracting said tracking pilot signals from reproduced signals obtained from said magnetic heads through said third switching means;

selector means for selecting a reference pilot signal from among four reference pilot signals generated with frequencies the same as those of said first, second, third and fourth pilot signals, respectively;

switching control means for generating control signals for said first, second and third switching means and said selector means on the basis of a rotary phase of said rotary drum;

tracking error detecting means for producing a tracking error signal by comparing a pilot signal extracted from the reproduced signal obtained through said third switching means with the selected reference pilot signal; an means responsive to said tracking error signal for causing said first, second, third and fourth magnetic heads, in said reproducing mode, to track the recording tracks in which the information and superimposed pilot signals were recorded by said first, second, third and fourth magnetic heads, respectively, in said recording mode.

5. A video recording an/or reproducing apparatus as in claim 4; in which said recording medium is in the form of a magnetic tape wrapped about said rotary drum with a wrapping angle of approximately 270°, and said first, second, third and fourth heads scan said first, second third and fourth recording tracks, respectively, during each three successive revolutions of said drum.

6. A video recording and/or reproducing apparatus as in claim 4; in which said recording medium is in the form of a magnetic tape wrapped about said rotary drum with a wrapping angle substantially exceeding 270°, and said information recorded by each of said first, second, third and fourth heads, respectively, includes video information which is supplied to the respective head during the scanning of a portion of the respective one of said recording tracks corresponding to a wrapping angle of 270° so that a overscan portion remains in each of said recording tracks for receiving recorded audio information.

7. A video recording and/or reproducing apparatus as in claim 4; further comprising first, second, third and fourth gated amplifier means connected with said first, second, third and fourth magnetic heads, respectively, for supplying said information and superimposed pilot signals to the latter in said recording mode; and in which said switching control means is operative, in said recording mode, to provide first, second, third and fourth gating signals to said first, second, third and fourth gated amplifiers, respectively, for ensuring that said first, second, third and fourth pilot signals are recorded by said first, second, third and fourth magnetic heads, respectively, in the recording tracks scanned thereby.

8. A video recording and/or reproducing apparatus as in claim 7; in which said recording medium is in the form of a magnetic tape wrapped about said rotary drum, and said first, second, third and fourth heads scan first, second, third and fourth recording tracks, respectively, during each three successive revolutions of said drum; and in which said switching control means includes first pulse generating means responsive to rotation of said drum to provide a phase indicating pulse at each revolution of said drum, second pulse generating means also responsive to rotation of said drum to provide a clock pulse at a frequency determined by the rotational speed of the drum, a first counter receiving said phase indicating pulse and dividing the latter by three to provide a pulse for each three revolutions of said drum, presettable counter means preset by said pulse for each three revolutions of the drum and being operative to count said clock pulse, and encoding means responsive to predetermined counts of said presettable counter means for providing said gating signals to said gated amplifier means.

9. A video recording and/or reproducing apparatus as in claim 8; in which said switching control means further includes another presettable counter means preset to zero by said pulse for each three revolutions and counting said clock pulse to provide a head switching signal which changes its level as each of said magnetic heads commences scanning of a respective recording track on said magnetic tape, said head switching signal being applied to said third switching means for controlling the latter, first and second D-type flip-flops for providing output pulses to control said first and second switching means, respectively, said first D-type flip-flop having a clock input receiving said head switching signal, and inverting means through which said second D-type flip-flop receives said head switching signal at a clock input thereof, said first and second D-type flip-flops having respective reset inputs receiving said pulse for each three revolutions.

10. A video recording and/or reproducing apparatus as in claim 9; in which said selector means receives said head switching signal and said output pulse from said first D-type flip-flop for selecting said reference pilot signal on the basis thereof.

11. A video signal reproducing apparatus for use with a magnetic recording tape on which parallel slant tracks having first and second different recording azimuth gap angles are alternately formed with an equal track pitch, and four kinds of tracking pilot signals having respective different frequencies are cyclically recorded in said slant tracks together with an information signal, comprising:

four reproducing magnetic heads of which first and third reproducing magnetic heads have said first azimuth gap angle and second and fourth reproducing magnetic heads have said second azimuth gap angle;

a rotary drum on which said first, second, third and fourth heads are mounted in the order stated with substantially equal angular distances therebetween for scanning the magnetic recording in a repeated sequence;

first switching means for switching between outputs of said first and third reproducing magnetic heads;

second switching means for switching between outputs of said second and fourth reproducing magnetic heads;

third switching means for switching outputs from said first and second switching means in synchronism with rotation of said rotary drum;

means for extracting said tracking pilot signals from reproduced signals obtained from said reproducing magnetic heads through said third switching means;

selector means for selecting a reference pilot signal from among four reference pilot signals generated with frequencies the same as those of said four kinds of tracking pilot signals, respectively;

switching control means for generating control signals for said first, second and third switching means and said selector means on the basis of a rotary phase of said rotary drum;

tracking error detecting means for producing a tracking error signal by comparing a pilot signal extracted from the reproduced signal obtained through said third switching means with the selected reference pilot signal; and means responsive to said tracking error signal for causing each of said reproducing magnetic heads to track one of said recording tracks in which there is recorded the kind of said tracking pilot signals having the same frequency as the reference pilot signal selected during the scanning of the magnetic recording tape by the respective reproducing magnetic head.

12. A video signal reproducing apparatus as in claim 11; in which said magnetic tape is wrapped about said rotary drum, and said first, second, third and fourth heads scan first, second, third and fourth recording tracks, respectively, during each three successive revolutions of said drum; and in which said switching control means includes first pulse generating means responsive to rotation of said drum to provide a phase indicating pulse at each revolution of said drum, second pulse generating means also response to rotation of said drum to provide a clock pulse at a frequency determined by the rotational speed of the drum, a first counter receiving said phase indicating pulse and dividing the latter by three to provide a pulse for each three revolutions of said drum, presettable counter means preset to zero by said pulse for each three revolutions and counting said clock pulse to provide a head switching signal which changes its level as each of said magnetic heads commences scanning of a respective recording track on said magnetic tape, said head switching signal being applied to said third switching means for controlling the latter, first and second D-type flip-flops for providing output pulses to control said first and second switching means, respectively, said first D-type flip-flop having a clock input receiving said head switching signal, and inverting means through which said second D-type flip flop receives said head switching signal at a clock input thereof, said first and second D-type flip-flops having respective reset inputs receiving said pulse for each three revolutions.

13. A video signal reproducing apparatus as in claim 12; in which said selector means receives said head switching signal and said ouput pulse from said first D-type flip flop for selecting said reference pilot signal on the basis thereof.

* * * * *